United States Patent
Marro et al.

(10) Patent No.: US 7,292,833 B2
(45) Date of Patent: Nov. 6, 2007

(54) RECEPTION SYSTEM FOR MULTISENSOR ANTENNA

(75) Inventors: Claude Marro, Plouguiel (FR); François Hamon, Rennes (FR)

(73) Assignee: France Telecom, SA, Paris (FR)

( * ) Notice: Subject to any disclaimer, the term of this patent is extended or adjusted under 35 U.S.C. 154(b) by 523 days.

(21) Appl. No.: 10/258,670

(22) PCT Filed: Apr. 25, 2001

(86) PCT No.: PCT/FR01/01262

§ 371 (c)(1),
(2), (4) Date: Mar. 20, 2003

(87) PCT Pub. No.: WO01/84881

PCT Pub. Date: Nov. 8, 2001

(65) Prior Publication Data

US 2003/0157965 A1     Aug. 21, 2003

(30) Foreign Application Priority Data

Apr. 28, 2000   (FR) .................................. 00 05601

(51) Int. Cl.
  *H04B 1/10*    (2006.01)
  *H04B 1/06*    (2006.01)
  *H04B 7/00*    (2006.01)
  *H04J 11/00*   (2006.01)

(52) U.S. Cl. .................. 455/296; 455/222; 455/278.1; 370/210

(58) Field of Classification Search ................ 455/132, 455/222, 278.1, 283, 296; 370/210
See application file for complete search history.

(56) References Cited

U.S. PATENT DOCUMENTS 4,370,749 A * 1/1983 Levy et al. ................. 375/346
5,299,148 A * 3/1994 Gardner et al. ............. 702/196
5,815,418 A * 9/1998 Dolazza et al. ............... 702/86

(Continued)

FOREIGN PATENT DOCUMENTS

DE      198 18 608 A1   10/1999
EP      0 386 765 A2     9/1990
EP        0903960 A1  *  3/1999

OTHER PUBLICATIONS

C. Marro et al.: *"Analysis of Noise Reduction and Dereverberation Techniques Based on Microphone Arrays with Postfiltering"* IEEE Transactions on Speech and Audio Processing, US, IEEE New York, vol. 6, No. 3, May 3, 1998; pp. 240-259, XP000785354.

(Continued)

*Primary Examiner*—Nay Maung
*Assistant Examiner*—Andrew Wendell
(74) *Attorney, Agent, or Firm*—Lowe Hauptman Ham & Berner LLP

(57) ABSTRACT

The present invention relates to a receiving system for a multi-sensor antenna and comprising:
  at least one set of channel filters ($310_j$, $710_k$, 1 ... N) filtering the signals $X_i(t,f)$ received by the different antenna sensors, where these signals may include a desired signal ($S_i(t,f)$);
  a summer (350, 720) summing the filtered signals [$V_i(t,f)$], where i=1 ... N, by means of the channel filters and emitting an antenna output signal Y(t,f),
  at least one calculating module (320, 720) receiving either the sensor signals and aligning them in phase or the signals filtered by the channel filters, said module estimating the transfer function (W(t,f), W k(t,f)) of an optimum filter in a manner to minimize the square difference between the antenna output signals filtered by said filter and the desired signal characterized in that if furthermore comprises at least one statistical analysis module (330, 730) operating on the frequency values of the transfer function.

21 Claims, 9 Drawing Sheets

U.S. PATENT DOCUMENTS 5,822,360 A * 10/1998 Lee et al. .................... 375/140
5,838,740 A * 11/1998 Kallman et al. ............ 375/346
5,940,429 A * 8/1999 Lam et al. .................. 375/130
6,219,376 B1 * 4/2001 Zhodzishsky et al. ...... 375/148
6,243,430 B1 * 6/2001 Mathe ........................ 375/346
6,417,737 B1 * 7/2002 Moloudi et al. ............ 330/301
6,466,913 B1 * 10/2002 Yasuda et al. .............. 704/500
6,804,313 B2 * 10/2004 Skafidas et al. ............ 375/350
6,931,123 B1 * 8/2005 Hughes ................. 379/406.01
2005/0186933 A1 * 8/2005 Trans ......................... 455/296

OTHER PUBLICATIONS

R. Zelinksi: International Conference on Acoustics, Speech and Signal Processing. ICASSP, US, New York, IEEE, vol. V. Conf. 13, Apr. 11, 1988; pp. 2578-2581, XP000042077.

E. Lleida et al.: *"Robust Continuous Speech Recognition System Based on a Microphone Array"* IEEE International Conference on Acoustics, Speech and Signal Processing, US, New York, NY: IEEE, Conf. 23, May 12, 1998; pp. 241-244, XP000854560.

* cited by examiner

RECEPTION SYSTEM FOR MULTISENSOR ANTENNA

RELATED APPLICATIONS

The present applications is a national phase application of PCT/FR2001/01262, filed Apr. 25, 2001, and claims priority to French Application Serial Number 00/05601, filed Apr. 28, 2000, the disclosures of which are hereby incorporated by reference herein in their entirety.

FIELD OF INVENTION

The present invention relates to a receiving system for a multi-sensor antenna. The sensors are arbitrary, i.e., they may be acoustic transducers, hydrophones, microphones, wireless antenna elements. Depending on the kind of sensor being considered, the invention is applicable to sound pickup (teleconferencing, video conferences, free-hand telephones communications etc.), to biomedical imaging, to submarine imaging or remote detection, to radio communications, to remote atmospheric detection etc.

BACKGROUND ART

FIG. 1 is a schematic diagram of a prior art multi-sensor antenna receiver. The antenna includes N sensors $100_i$ (i=1 . . . N) for detecting perturbed signals $x_i(t)$ where i=1 . . . N and t is the time. These signals are filtered by channel filters $110_i$, where i=1 . . . N, for monitoring several features of the antenna system, namely to assure that the antenna exhibits a particular directivity (aperture of the main lobe, magnitude of the secondary lobes, rejection in undesired directions, etc).

to allow pointing the antenna in the direction of the desired signal

The last stage derives the output of the antenna signal y(t) by summing the signals from the channel filters using a summer 150. The design of these filters in particular depends on the geometry of the detector array and on the kind of signals to be processed.

In a given application, the antenna performance may be mediocre. In particular, reduction of interferences may be inadequate. Said reduction is a feature of antenna effectiveness and is denoted by the antenna's SN (signal to noise) gain. The term "noise" herein denotes the set of interfering signals that the antenna must reduce. In order to increase the signal to noise ratio, it is known to post-filter the antenna output signal. FIG. 2 shows the principle of operation of such a filter.

The combination of a multisensor antenna and post filtering was first described by J B Allen in 1977 [Allen 77]. This technique was described to remove reverberation from a voice signal when detecting remote sound in an interfering medium. The sound is picked up by two microphones and the full processing (estimating the post-filter, applying and post-filtering)—which is based on the coherence function—is carried out in the frequency domain. In 1988 R Zelinski [Zelinkski 88] extended these techniques to recording sound using more sensors. K U Simmer [Simmer 92a] proposed stating the post-filter transfer function according to a Wiener filtering method. The analysis below describes the above methods. Further details are found in [Marro 98].

Assuming that the post-filtering illustrated in FIG. 2 relates to sound detection, the noise signals $x_i(n)$ are picked up by an antenna composed of N microphones ($200_i$), I=1 . . . N, where $$x_i(n)=s(n-\tau_{Mi})+n_i(n), \quad (1)$$

where i=1 . . . N, s is the desired voice signal and $n_i$ is the noise level at the pickup $200_i$. Because of the "digital signal processing" formalism, n in this instance stands for the discrete time coefficient, $E_{Mi}$ is the delay inserted by propagation between the sound from the source s(n) and that reaching the microphone $200_i$. To shift this signal in phase again (i.e., pointing the antenna in the direction of the source), the antenna is aimed in the direction of the desired emitter by means of filters r:(n)

$$v_i(n)=r_i(n)*x_i(n), \quad (2)$$

where i=1 . . . N, and $v_i(n)$ is $x_i(n)$ delayed. As shown in FIG. 2, each microphone signal $x_i(n)$ is subjected to a delay $\tau_i$ (this delay being provided by the filter $r_i(n)$). The signals $V_i(f)$ represent signals $v_i(n)$ in the frequency domain, f denoting frequency. This operation is carried out using DFT (discrete Fourier transform) blocks. The 1/N multiplier which is applied following channel summation is a normalization coefficient assuring that the antenna gain is unity for the desired signal. The gain is an integral part of the antenna and provides the output signal Y(f). The post filter 260, having a transfer function W(f) which is estimated from the channel signals $V_i(f)$ and/or from the antenna output Y(f) (the way of calculating W(f) is described below), is applied to Y(f). The last synthesizing block converts the output signal back into the time domain.

The optimal filter $W_{opt}$ having an input corresponding to the antenna output y, is attained by minimizing the means square error between the desired signals and the estimated signal s. This optimal filter is described in terms of the desired s and means noise n at the antenna output [Simmer 92a]

$$W_{opt}(f) = \frac{\Phi_{ss}(f)}{\Phi_{ss}(f)+\Phi_{nn}(f)} \quad (3)$$

where $\Phi_{SS}(f)$ and $\Phi_{nn}(f)$ are the spectral power densities of the desired signal and the noise at the output of channel formation. This result follows from the following assumptions:

A1: The signal $x_i(n)$ incident on each sensor is modeled as the sum of the desired signal plus the noise according to eq. 1, A2: The noise $n_i(n)$ and the desired signal s(n) are uncorrelated, A3: The noise spectral power densities are identical at each sensor, namely, $\Phi_{n_in_i}(f)=\Phi_{nn}(f)$ where i=1 . . . N, A4: The noises of the sensors are uncorrelated (the interspectral power densities $\Phi_{n_in_j}(f)$ are zero when i≠j), A5: The input signal $x_i(n)$ are perfectly reset to be in phase with s(n).

A priori, the two values $\Phi_{SS(f)\ and\ }\Phi_{nn}(f)$ required to calculate $W_{opt}(f)$ are unknown and it is difficult to estimate them. In the methods known in the state of the art, $\Phi_{SS}(f)$ and $\Phi_{nn}(f)$ are estimated on the basis of signals incident on different sensors, Illustratively, assuming the noises detected by each microphone being uncorrelated, the estimate of the spectral power density (hereafter SPD) of the desired signal $\Phi_{SS}(f)$ may be attained by estimating the interspectral power densities (hereafter IPD) $\Phi_{v_i v_j}(f)$ of the microphone signals i and j that were reset to be in phase. In that event the spectral magnitudes $\Phi_{v_i v_i}(f)$ and $\Phi_{v_i v_j}(f)$ may be written as $$\Phi_{v_i v_j}(f) = \Phi_{SS}(f) + \Phi_{nn}(f) \quad (4)$$

$$\Phi_{v_i v_j}(f) = \Phi_{SS}(f), \, i \neq j \quad (5)$$

One way of estimating $W_{opt}(f)$ is to use an average of these spectral and interspectral power densities respectively in the denominator and in the numerator, from $$\hat{W}(f) = \frac{\frac{2}{N(N-1)} \gamma \left( \sum_{i=1}^{N-1} \sum_{j=i+1}^{N} \hat{\Phi}_{v_i v_j}(f) \right)}{\frac{1}{N} \sum_{i=1}^{N} \hat{\Phi}_{v_i v_i}(f)} \quad (6)$$

where $\gamma(.) = \text{Re}t(.)$ or $\gamma(.) = |.|$,

The use of the module operator or the real part $\gamma(.)$ is valid because of the magnitude which must be estimated in the numerator $\Phi_{SS}(f)$ and which must be real and positive. The notation ˆ means the (statistical) estimate of the particular value.

The estimator $\hat{W}(f)|_{\gamma(.)=Re(.)}$ was proposed by R. Zelinski [Zelinski 88] to be used in the time domain. [Simmer 92a indicates estimating and filtering are carried out in the frequency domain. $\hat{W}(f)|_{\gamma(.)=|.|}$ is an extension of two-sensor processing described by Allan [Allen 77] to an arbitrary number of sensors. Indeed eq. 6, when considered algorithmically, represents two estimating methods using the Wiener filter, namely $\hat{W}(f)|_{\gamma(.)=Re(.)}$ and $\hat{W}(f)|_{\gamma(.)=|.|}$.

Another estimator which uses the SPD of the antenna output signal, $\Phi_{yy}(f)$, was proposed by Simmer [Simmer 92b], namely $$\hat{W}(f) = \frac{\frac{2}{N(N-1)} \gamma \left( \sum_{i=1}^{N-1} \sum_{j=i+1}^{N} \hat{\Phi}_{v_i v_i}(f) \right)}{\sum_{i=1}^{N} \hat{\Phi}_{yy}(f)} \quad (7)$$

The spectral magnitudes required to estimate the filter W(f), in this instance $\Phi_{yy}(f)$, $\Phi_{v_i v_i}(f)$, and $\hat{\Phi}_{yy}(f)$ must be estimated in turn from the signals $V_i(f)$ and $Y(f)$. In practice, using voice signals and a post-filter in an actual environment requires estimating to reliably monitor the non-stationary nature of such signals, while nevertheless guaranteeing admissible quality of estimation. In the Figure, the block 220 corresponds to the processing phase wherein $\hat{\Phi}_{v_i v_i}(f)$, $\hat{\Phi}_{v_i v_j}(f)$ and $\Phi_{v_i v_j}(f)$ are estimated.

The receiving systems for multi-sensor antennas such as described above—whether or not using post-filtering—do not provide noise elimination in the absence of a desired signal. Moreover, when post-filtering is used, the noise (i.e. the interfering signal(s)), if attenuated by the post-filter, is also distorted by it. In many applications and in particular with respect to sound pickup, distorting an interfering signal, such as that generated by an interfering source within a sound receiving zone, produces an especially bothersome effect.

The basic problem to be solved by the present invention is to ascertain whether a desired signal is in fact present in a receiving zone of a multi-sensor antenna.

A first subsidiary problem to the basic goal of the embodiment of the present invention is to determine the incidence, i.e., the direction of an incoming signal, of any desired signal in the receiving zone.

A second subsidiary problem basic to another embodiment of the invention is to suppress the interference effect when the desired signal is deemed to be absent.

SUMMARY OF THE INVENTION

The above overall problem is solved by a receiving system for a multi-sensor antenna. The receiving system includes at least one set of channel filters for filtering signals X i (t, f) arranged to be received at different sensors of the antenna. The signals possibly include a desired signal (S1 (t, f)). At least one calculating arrangement receives either the sensor signals and aligns them in phase, or the signals filtered by the channel filters. The calculating arrangement (a) estimates the transfer function of an optimum filter (W(t, f), W k(t, f)) in a manner to minimize the squared difference between the antenna output signal filtered by said filter and the desired signal, (b) sums the signals (V i(t, f), V i,k(t, f); i=1 . . . N) filtered by the channel filters, (c) derives an antenna output signal Y(t, f), (d) statistically analyzes the frequency values of the transfer function, and (e) derives an indication of the presence of a signal in a receiving zone in response to the statistically analyzed frequency values.

The first subsidiary problem is solved by a receiving system comprising K sets of channel filters where K>1. Each set of filters corresponds to a beam that propagates in a different direction. The calculating arrangement (a) calculates the optimum filter transfer function (W k(t, f)) associated with K sets of channel filters, (b) statistically analyzes the frequency values of the K transfer functions (W k(t, f): k=1 . . . K), and (c) determines the incidence m∈{1 . . . K} of the signal based on the results of the K statistical analyses.

The second subsidiary problem is solved by the calculating arrangement of receiving system that performs (1) a post-filtering operation in accordance with the transfer function of the optimum filter, W(t, f), or the optimum filter W m(t, f) in the case of the calculating arrangement being arranged for performing plural calculations, (2) a constant-gain attenuation operation, and (3) switching of the antenna output signal either to the post-filter operation or to the attenuation operation depending on a switching signal.

Overall, the system of the invention estimates the presence of a desired signal and/or the incidence of a desired signal by calculating the transfer function of an optimal post-filter (or of set of optimal post-filters) regardless of the post-filter being applied to the antenna output. Statistical analysis of the frequency values of the transfer function, in particular its variation and the rate at which frequency values are occupied beyond a given threshold, allows deriving an index of presence regarding the desired signal.

When several sets of channel filters are used, each set corresponding to pointing the antenna in one given direction, the system estimates in what direction the desired source is situated.

Lastly, when post-filtering is carried out at the antenna output, the adverse effect of the post-filter is eliminated by switching the output signal to the input of a fixed-gain attenuator when the system concludes the desired signal is absent. Moreover gain smoothing between the fixed gain and the post-filter gain is provided in order to reduce transients during switching.

The invention is described below by means of a comprehensive discussion of the following Figures.

The above cited features of the invention as well as others is described in the following description of an illustrative embodiment and in relation to the attached drawings.

DETAILED DESCRIPTION OF THE DRAWING

In the first place the notation describing the values below must be defined. Thus the notation A(t, f) is the value "a" at time t and at frequency f. This notation is used to describe the value in the frequency domain while varying in time. Also, an interval of observation is required when a signal passes from the time domain to the frequency domain. In this sense A(t, f) is a value known at time t, though its computation may have required a finite time interval. A(t, f) also may be a signal, or a spectral magnitude (such as SPD or IPD), or a time-varying filter. In the same manner, the notation A(t) represents the time-varying value "a" at time t, however all its frequency components are identical during the pertinent interval of observation. The notation A(f) indicates the value "a" at frequency f and only relates to those antenna channel filter which weight frequency-wise but which remain fixed in time.

On the other hand, the expression "gain" used hereafter covers both amplification (gain larger than 1) and attenuation (gain less than 1).

Figure 1:
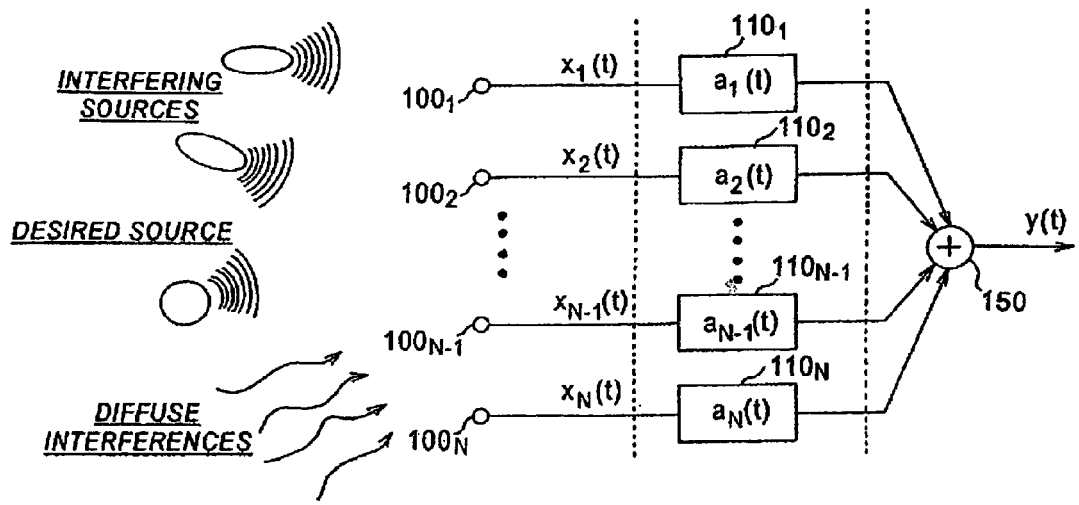
FIG. 1 is a functional block diagram of a multi-sensor antenna.
Figure 2:
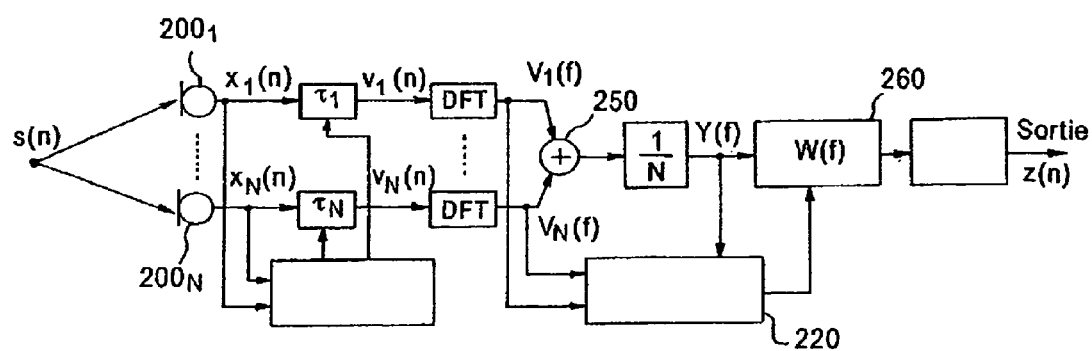
FIG. 2 is a functional block diagram of a multi-sensor antenna fitted with post-filtering.
Figure 3:
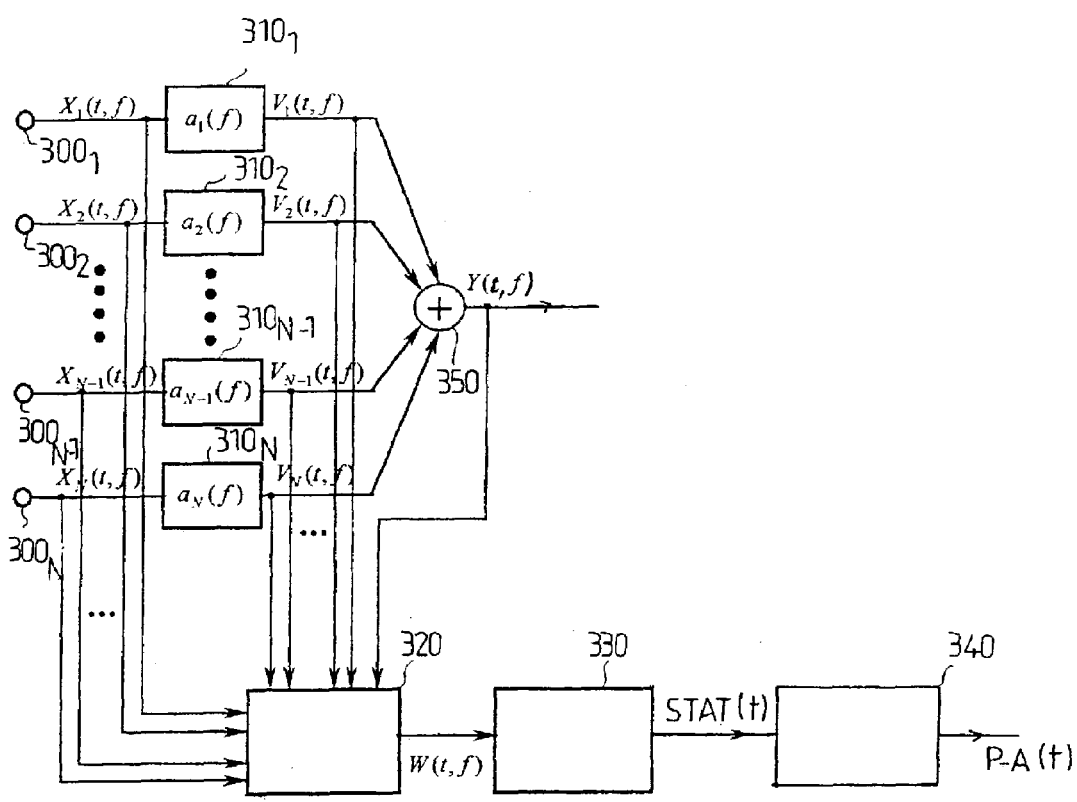
FIG. 3 is a functional block diagram of a multi-sensor antenna associated with a receiving system, the presence of a desired signal being determined in the manner of the present invention.

FIG. 3 is an illustration of the global principle of the invention.

The antenna Input signals $X_i(t, f)$, $I=1, \ldots N$, detected by the sensors 300, are filtered by channel filters 310$_i$ having respective transfer functions $a_i(f)$. As already indicated in the discussion of the state of the prior art, these fixed filters are designed so they control antenna directivity. Also, they allow pointing the antenna in a given direction. The antenna output Y(t, f) is attained by summing the signals $V_i(t, f)$ so derived.

Also, the system comprises a block 320 for calculating the optimal filter transfer function (for instance that of the post-filter if such a filter is used at the antenna output) based on the channel signals. The channel signals can be detected either directly at the sensors [($X_i(t, f)$ signals] or following channel filtering, by the 310$_i$ filters [$V_i(t, f)$ signals]. The antenna output signals Y(t, f) also can be used by the calculating block to estimate the transfer function of the post-filter. FIG. 3 shows these diverse modes. It must be borne in mind that the system of these embodiments does not include a post-filter, only the transfer function of this post-filter being calculated.

The system also includes a statistical analysis block 330 for the time-dependent frequency values W(t, f): this block is comprehensively described below and it derives a set of analytical results STAT(t).

Even though used can be made of any state of the art antenna, the embodiment including channel filters 310, (which is based on the technique of superdirectional antenna taking into account module and phase) is advantageously used; an antenna is described in applicant's patent application EP 903,960 A. This approach is outlined as follows:

Assuming an environment composed of a desired source $S_1(f)$, a localized coherent interfering sources $S_2(f)$ and an incoherent noise B(f), and let $d_{pi}$ be the distance between source p and the antenna sensor i, c the speed of propagation. Then the signal $X_1(f)$ detected at the sensor 300$_1$ is given by the following relation:

$$X_i(f) = \frac{S_1(f)}{d_{1,i}} e^{-j\frac{2\pi f}{c}d_{1,i}} + \frac{S_2(f)}{d_{2,i}} e^{-j\frac{2\pi f}{c}d_{2,i}} + B_i(f) \qquad (8)$$

where $B_i(f)$ is the incoherent noise measured at the sensor i.

The antenna processing being linear, the output Y(f) is a linear combination of the signals detected by the various sensors:

$$Y(f) = \sum_{i=1}^{N} a_i(f) X_i(f) \qquad (9)$$

Let $\tau_{ip}$ be the delay applied to the sensor i and assume the antenna points in the desired direction. Then $\exp(j2\pi f\tau_i)$ represents the phase reset of the desired signal as regards the sensor 300$_i$. This phase reset is included in the weight $a_i(f)$ which is linked to $b_i(f)$ by the relation.

$$a_i(f) = b_i(f) \exp(j2\pi f\tau_i) \qquad (10)$$

In this manner and as regards the desired source or the noise under consideration, a vector is defined to describe the attenuation of the signal amplitudes at the antenna elements. This vector is normalized with respect to the attenuation undergone by the signal detected at the sensor nearest to the source by the following expression $$\alpha_{p,i} = \frac{\min\{d_{p,i}\}}{d_{p,i}} \qquad (11)$$

The gain of the desired signal and the gain of the coherent interference signal are respectively $$G_1(f) = \sum_{i=1}^{N} b_i(f)\alpha_{1,i} \quad (12)$$

and $$G_2(f) = \sum_{i=1}^{N} b_i(f)\alpha_{2,i} \exp\left(j2\pi f \frac{d_{1,i} - d_{2,i}}{c}\right) \quad (13)$$

The directivity factor Fd(f) is calculated by varying the position of the interfering source so as to attain a mean of the gain of the interfering signal for all directions, as $$Fd(f) = \frac{|G_1(f)|^2}{\text{mean}(|G_2(f)|^2)} = \frac{\sum_{i=1}^{N} b_i(f)\alpha_{1,i}}{\frac{1}{4\pi}\int_\varphi \int_\theta \left|\sum_{i=1}^{N} b_i(f_n)\alpha_{2,i} e^{j2\pi f \frac{d_{1,i}-d_{2,i}}{c}}\right|^2 \sin\theta d\varphi d\theta} \quad (14)$$

where $\Phi$ and $\theta$ respectively represent the azimuth and elevation angles in space.

All the above defined values can be rewritten in vector and matrix form, as $$b(f)=(b_i(f) \ldots b_a(f)) \quad (15)$$

$$\alpha_i(f)=(\alpha_{1,1} \ldots \alpha_{1,N}) \quad (16)$$

$$\alpha_2(f) = \left(\alpha_{2,1} e^{j2\pi f \frac{d_{1,1}-d_{2,1}}{c}} \ldots \alpha_{2,N} e^{j2\pi f \frac{d_{1,N}-d_{2,N}}{c}}\right) \quad (17)$$

Accordingly the directivity factor Fd(f) may be written as:

$$Fd(f) = \frac{b(f)A(f)b^H(f)}{b(f)D(f)b^H(f)} \quad (18)$$

where $A(f)=\alpha_i(f)\alpha_i^H(f)$ (19)

and $$D(f) = \frac{1}{4\pi}\int_\varphi \int_\theta \alpha_2(f)\alpha_2^H(f)\sin\theta d\varphi d\theta \quad (20)$$

and the notation $^H$ denotes a conjugate transposition.

The known and inherent problem of super-directional antennas is that they lack stability: they exhibit a large directivity factor at the cost of inadmissibly amplifying the incoherent which can be represented by the following expression $$G_a(f) = \frac{1}{\sum_{i=1}^{N}|b_i(f)|^2} = \frac{1}{b(f)b^H(f)} \quad (21)$$

The method proposed in the patent application EP 903, 960 A comprises finding the linear processing which maximizes the directivity factor Fd(f) under the following constraints:

1. a linear constraint prohibiting any distortion in the desired signal, which is mathematically stated as $$|G_i(f)|=|b^H(f)\alpha_1(f)|=1 \quad (22)$$

2. a non-linear constraint which fixes the minimum reduction of the incoherent noise and applied by the user, $G_{amin}(f)$, which is mathematically stated as $$b(f)B^H(f)<1/[G_{amin}(f)] \quad (23)$$

3. additional linear constraints as desired by the user, for instance strong attenuations in given directions, a fixed main lobe width etc. These are mathematically stated as $$C^H(f)b(f)=u^H(f) \quad (24)$$

where C(f) is the constraints matrix and u(f) is the constraints vector. Each column of C(f) contains a vector corresponding to a direction in space and the corresponding u(f) column contains the conjugate of the transfer function required by this direction.

On the other hand, the directivity factor Fd(f) is maximized by minimizing the denominator of eq. 18. Accordingly the mathematical description is as follows:

$$\text{Min}(b(f)D(f)b^H(f)) \quad (25)$$

provided that $|b^H(f)\alpha_i(f)|=1$ and $b(f)b^H(f)<1/[G_{amin}(f)]$ and $C^H(f)b(f)=u^H(f)$.

This problem can be solved by an iterating algorithm or by using Lagrange multiplier. In this manner optimal filters $b_i(f)$ in the sense of this problem are attained, resulting in the channel filters $\alpha_i(f)$, such as are illustrated in FIG. 3 using eq. 10.

Marro [Marro 98] renders as follows the expression for W(t, f) leading to the best results:

$$W(t,f) = \frac{\sum_{i=1}^{N}|b_i(f)|^2 \gamma\left(\sum_{i=1}^{N-1}\sum_{j=i+1}^{N}\hat{\Phi}_{v_i v_j}(t,f)\right)}{\gamma\left(\sum_{i=1}^{N-1}\sum_{j=i+1}^{N}b_i(f)b_j^*(f)\right)\sum_{i=1}^{N}\hat{\Phi}_{v_i v_i}(t,f)} \quad (26)$$

where * denotes conjugate operation. Be it borne in mind that $\gamma(.)=\text{Re}(.)$ or the $\gamma(.)=|.|$.

The expression for W(t, f) used in the present document takes into account the attenuation undergone by the desired signal. The expression is derived by considering that the transfer function W(t,f) must be unity when only the desired signal is active. The following expression is proposed $$W(t, f) = \frac{\sum_{i=1}^{N} |b_i(f)|^2 \alpha_{1,i}^2 \; \gamma\left(\sum_{i=1}^{N-1} \sum_{j=i+1}^{N} \hat{\Phi}_{vi\,vj}(t,f)\right)}{\gamma\left(\sum_{i=1}^{N-1} \sum_{j=i+1}^{N} b_i(f) b_j^*(f) \alpha_{1,i} \alpha_{1,j}\right) \sum_{i=1}^{N} \hat{\Phi}_{v_i v_i}(t,f)} \quad (27)$$

or, alternatively, if the antenna output Y(t, f) is used to estimate the spectral density $$W(t, f) = \frac{\gamma\left(\sum_{i=1}^{N-1} \sum_{j=i+1}^{N} \hat{\Phi}_{vi,vj}(t,f)\right)}{\gamma\left(\sum_{i=1}^{N-1} \sum_{j=i+1}^{N} b_i(f) b_j^*(f) \alpha_{1,i} \alpha_{1,j}\right) \Psi_{YY}(t,f)} \quad (27')$$

It is clear that the spectral density (eq. 27) and the interspectral density (eqs. 27 and 27") can be estimated based on a reduced sensors sub-set (cardinal number M>N). In that case summation is carried out on this sub-set.

Alternatively the post-filter design described in the French patent application 99-02662 and filed on 26 Feb. 1999 by applicant can be used.

Presence of the desired signal is estimated based on a statistical analysis of the frequency values of the transfer function W(t, f).

The principle of this analysis rests on using two types of statistical values: the mean value (stated as the proportion of occupancy above a given threshold) and the variance of the frequency values of the transfer function W(t, f): the mean value approaches 1 in the presence of a desired signal and the variance increases in the presence of noise. These two complementary pieces of information can be advantageously combined in order to circumvent false readings, in particular as regards noise.

Figure 5:
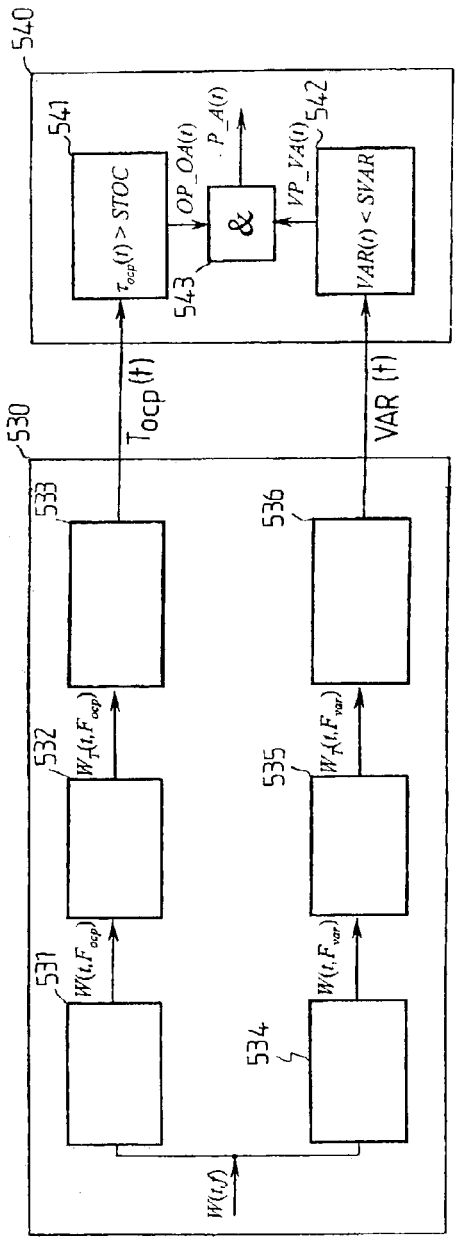
FIG. 5 is a functional block diagram of the statistical analysis module and the desired signal presence detector when using a single set of channel filters.

FIG. 5 shows a detail of an embodiment of the statistical analysis module.

The transfer function W(t, f) is shown at the input of the module 530. The calculation of the post-filter occupancy rate is described first. Using retrieval means 531, a user-determined set of frequencies $F_{ocp}$ is retrieved from W(t, f). The resulting signal then is transformed non-linearly in the module 532 to attain more pertinent information. Advantageously a logarithmic transformation (in dB) is undertaken:

$$W_\tau(t, f_{ocp}) = 20 \, \text{Log}(|W(t, F_{ocp})|) \quad (28)$$

Among the set of frequencies $F_{ocp}$, kept in this manner in W(t, $f_{ocp}$), the module 533 ascertains the rate of frequencies $\tau_{ocp}(t)$ at which $W_\tau(T, f_{OCP})$ exceeds a threshold OCT:

$$\frac{\text{size of spectrum in } F_{ocp} \text{ such that } W_T(t, F_{ocp}) > OCT}{\text{size of the } F_{ocp} \text{ spectrum}} \quad (29)$$

In the processing chain of the post-filter's variance criterion, the W(t, f) values for a set of frequencies $F_{var}$ are retrieved in the module 534. A non-linear transformation is carried out in the module 535. These transformed values are denoted $W_\tau(t, F_{VAR})$. Thereupon the variance of these values is calculated in the block 536.

FIG. 5 also illustrates details of an embodiment of the signal-presence detector.

The statistical analysis results STAT(t) in the form of the occupancy proportion $\tau_{ocp}(t)$ and the variance VAR(t) are fed to said detector.

The value $\tau_{ocp}(t)$ is compared with an occupancy threshold OCTS in a comparator 541 that derives a binary signal OP_hd —OA(t), indicating there is a presumption of a desired signal being present, namely OP_OA(t)=OP if $\tau_{ocp}(t)>$OCTS or a presumption the desired signal is absent, namely OP_OA(t)=OA if $\tau_{ocp}(t) \leq$OCTS.

Similarly the $W_T(t, F_{var})$ variance, VAR(t), is compared with a variance threshold SVAR in a comparator (542) which derives a binary signal VP_Va(t) indicating the presumption of a desired signal being present, namely VP_VA(t)=VP if VAR(t)<SVAR or a presumption of a desired signal being absent, namely VP_VA(t)=VA if VAR(t)$\geq$SVAR.

The two binary data indicating the "presumption of the presence/absence of the desired signal", namely OP_OA and VP_VA are then supplied to an AND logic function 543 which emits the binary signal P_A indicating the presence P or absence A of the desired signal.

The manner in which signal detection is calculated herein is not limitative: the information of occupancy proportion and of variance each might be used alone; moreover other non-linear transformations than converting into dB—or no transformation at all—may be used.

The block estimating the presence of the desired signal also can provide information on the probability of the presence of the desired signal in lieu of the binary information based on the same statistical analysis.

Figure 4:
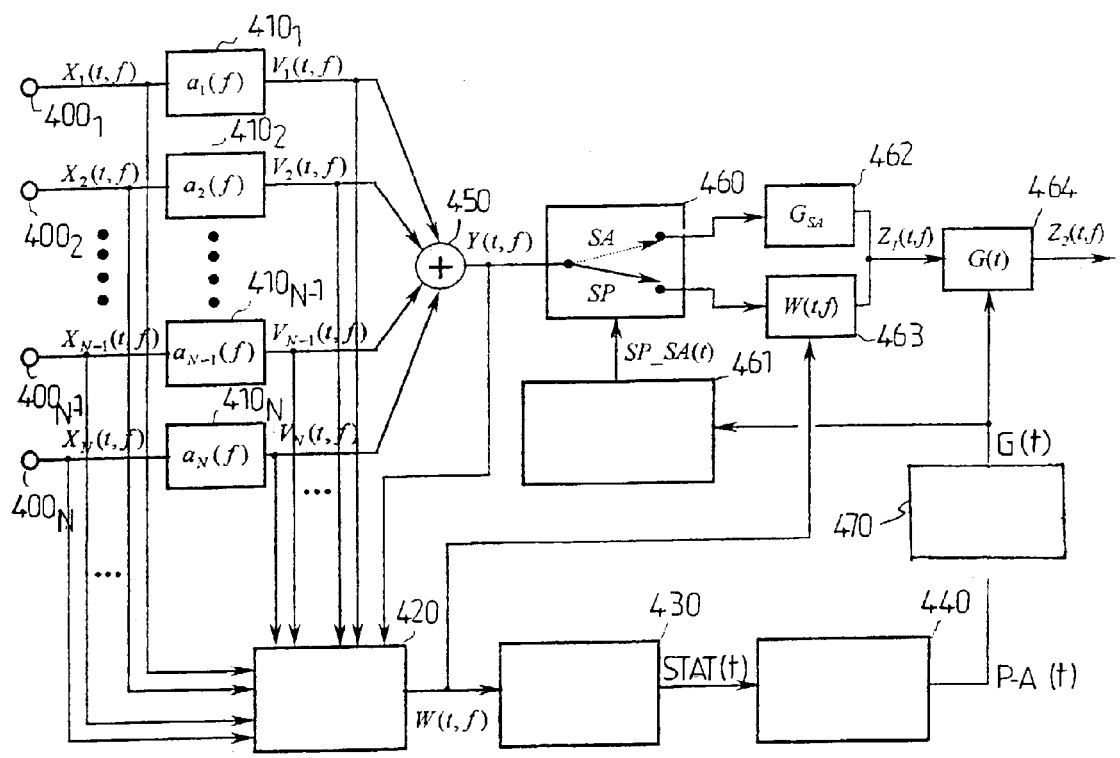
FIG. 4 is a functional block diagram of a receiving system for making a desired signal determination and performing post-filtering in the manner of an embodiment of the invention.

FIG. 4 shows an embodiment of the invention when post-filtering is carried out. The design of the receiving system shall be discussed first. The notation used is identical with that relating to FIG. 3. The post-filter transfer function is provided by the block 420 calculating the optimal filter. The receiving system of FIG. 4 also comprises a switch 460 for switching the antenna output signal Y(t, f) to an attenuator 462 of fixed gain $G_{SA}$ or to a post-filter 463 having a transfer function W(t, f). The signal resulting from either channel, namely $Z_j(t, f)$ is applied to a variable-gain amplifier 464 of gain G(t). The magnitude of the gain G(t) is calculated by a block 470 used for calculating and gain smoothing based on an indication of a desired signal being present. The switching signal at the antenna output, namely SP_SA(t), driving the switch, is the result of comparing the gain value with a switching threshold ST inside the comparator 461.

Whereas, in the prior art post-filtering receiving systems, the post-filter is permanently applied to the antenna output signal, as a consequence of which and as already discussed above. It is both impossible to completely suppress the interfering signal and may distort it, the embodiment of FIG. 4 on the other hand uses the presence/absence indication of a desired signal to respectively apply the post-filter or a constant attenuation. This monitoring of the antenna output signal offers a dual advantage over the state of the art: not only does the invention allow selecting of the attenuation, but it also makes it possible to circumvent the distortion of the residual perturbation. Time-smoothing of the gain is provided to assure continuity when switching the antenna output Y(t, f) from the post-filter toward the attenuation gain. Gain monitoring is carried out as follows: in the presence of the desired signal, the gain G(t) is near 1 and is applied at the antenna output in cascade with the post-filter W(t, f). When the system detects the absence of the desired signal, the gain G(t) decreases continuously and when it reaches a given threshold ST, the antenna output is switched toward a given fixed gain $G_{sa}$ in cascade with G(t). When a desired signal is detected, the gain G(t) increases continuously up to the threshold ST. Crossing the threshold triggering the switching of the antenna output into the other state.

More specifically, when the G(t) value crosses the threshold ST (selected between the values $S_{min}$ and $S_{max}$) in the upward direction, the comparison signal SP_SA(t) points the antenna output signal Y(t, f) toward the post-filter 463. When the G(t) value crosses the threshold ST in the downward direction, the comparison signal SP_SA(t) points the antenna signal Y(t, f) toward the constant-gain attenuator 462.

The transfer function W(t, f) is calculated in the same manner as that discussed in relation to FIG. 3.

Again the channel filters can be designed according to the optimization method disclosed in EP 903,960 A and already discussed above. Advantageously however the channel filter 400$_i$ are designed in such a way that their joint operation with the post filter W(t, f) is optimum. Two channel-filter optimizing methods are discussed below that relate to the post-filter output.

The objective of these two methods is to minimize the interference with the desired signal when an antenna is casonded with a post-filter: optimizing the two modules independently of each other leads indeed to substantially lower performance.

$$\text{Let } A_s(f) = \sum_{i=1}^{N} |b_i(f)\alpha_{1,i}|^2 \tag{30}$$

where the notation is the same as used in relation to FIG. 3.

The expression (30) also may be put in matrix form, namely $$A_s(f) = b(f)\Omega b^H(f), \Omega = \begin{bmatrix} \alpha_{1,1}^2 & 0 & \cdots & 0 \\ 0 & \alpha_{1,2}^2 & \ddots & 0 \\ \vdots & \ddots & \ddots & 0 \\ 0 & \cdots & 0 & \alpha_{1,N}^2 \end{bmatrix} \tag{31}$$

As regards the antenna, optimum performance is attained by maximizing the directivity factor Fd(f) and as regards the post-filter by minimizing $A_S(f)$.

First Method

That linear processing which maximizes the directivity factor Fd(f) and jointly minimizes $A_S(f)$ under the same constraints as those set by eqs. 22, 23 and 24 is to be determined.

The mathematical formulation of the optimization is as follows:

$$\text{Min}(b(f)((1-p(f))D(f)+p(f)\Omega b^H(f)) \tag{32}$$

subject to the constraints $|b^H(f)\alpha_1(f)|32\ 1$ and $b(f)b^H(f)<1/[G_{amin}(f)]$ and $C^H(f)b(f)=u^H(f)$.

The first term in (32) corresponds to maximizing the directivity factor (which is in the denominator of Fd(f) and the second to the minimization of $A_S(f)$, the scalar weighting p(f) allowing allocating relative weights to D(f) and to $\Omega$ according to the particular applications.

In the same manner as indicated in relation to the description of FIG. 3, the solution to this problem can be attained using an iterating algorithm or the Lagrange multipliers.

Actually, by constraining a minimum value $G_{amin}(f)$ on the reduction of the incoherent noise, $A_S(f)$ is implicitly minimized. A second method of the invention replaces the nonlinear constraint on the incoherent-noise reduction factor by a linear constraint on the directivity factor. This second method is significant because it allows control of the magnitude of the directionally factor as a function of frequency.

Second method

That linear processing minimizing $A_S(f)$ is sought observing the same constraints as those stated by eqs. 22 and 24, where the constraint fixed by eq. 23 is replaced by a linear constraint which sets the minimum value of the user-imposed directivity factor, namely $Fd_{min}(f)$, is sought, and is rendered by the following expression $$b(f)D(f)b^H(f)<1/[Fd_{min}(f)] \tag{33}$$

Accordingly the mathematical statement is the following:

$$\text{Min}(b(f)\Omega b^H<1/[Fd_{min}(f)]) \tag{34}$$

provided that $|b^H(f)\alpha_1(f)|=1$ and $b(f)D(f)b^H(f)<1/[Fd_{min}(f)]$ and $C_H(f)b(f)=u^H(f)$.

In the same manner as regards the first method, the solution of this problem can be attained by an iterating algorithm or by using Lagrange multipliers.

Figure 6:
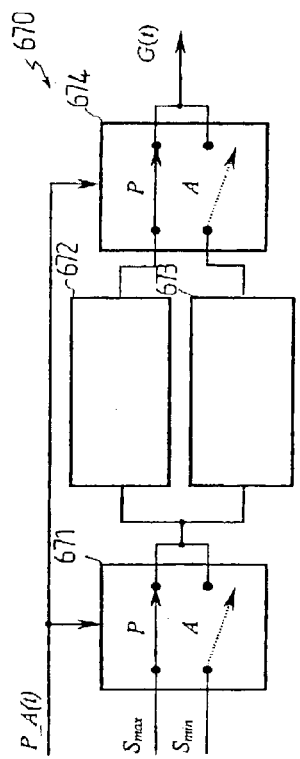
FIG. 6 is a functional block diagram illustrating gain smoothing relating to post-filter switching.

The block for calculating and smoothing the gain of FIG. 4 is now described. The operational diagram is illustrated by FIG. 6.

Let P be the desired signal's presence and A its absence. It is assumed that the desired-signal presence estimator derives a binary output $P_{\_A(t)}$.

The function of the block 670 for calculating and smoothing the gain continuously decreases the gain G(t) toward $S_{min}$ when passing from state P to state A and increases the gain G(t) toward the value $S_{min}$ when moving the other way.

The binary output P_A(t) varies in time and drives the switch 671 between two gain values $S_{min}$ and $S_{max}$. When the desired signal is present, the maximum value $S_{max}$, as already discussed above, in general has a value of 1, and is applied to the common input of the two lowpass filters 672 and 673. Where there is no desired signal, it has the maximum value $S_{min}$ that is fed to the common input. To ensure the continuous increase and then maintain the value of G(t) at $S_{max}$ when the binary output passes from the state A to the state P, the input signal is filtered by a lowpass filter 672 having a time constant $\tau_p$. The selection of this time constant determines the rise time of the signal G(t). In the same manner, to continuously decrease and then maintain G(t) at the $S_{min}$ value when the binary output passes from the state P to the state A, the input signal is filtered by a lowpass filter having a time constant $\tau_A$, which determines the fall time of G(t). The outputs of the two lowpass filters are connected to the inputs of a switch 674 which selects the output of the lowpass filter having the time constant $\tau_A$ if the desired signal is absent and the output of the lowpass filter having the time constant $\tau_P$ if the desired signal is present. The output of switch 674 provides the smoothed signal gain G(t).

Figure 7:
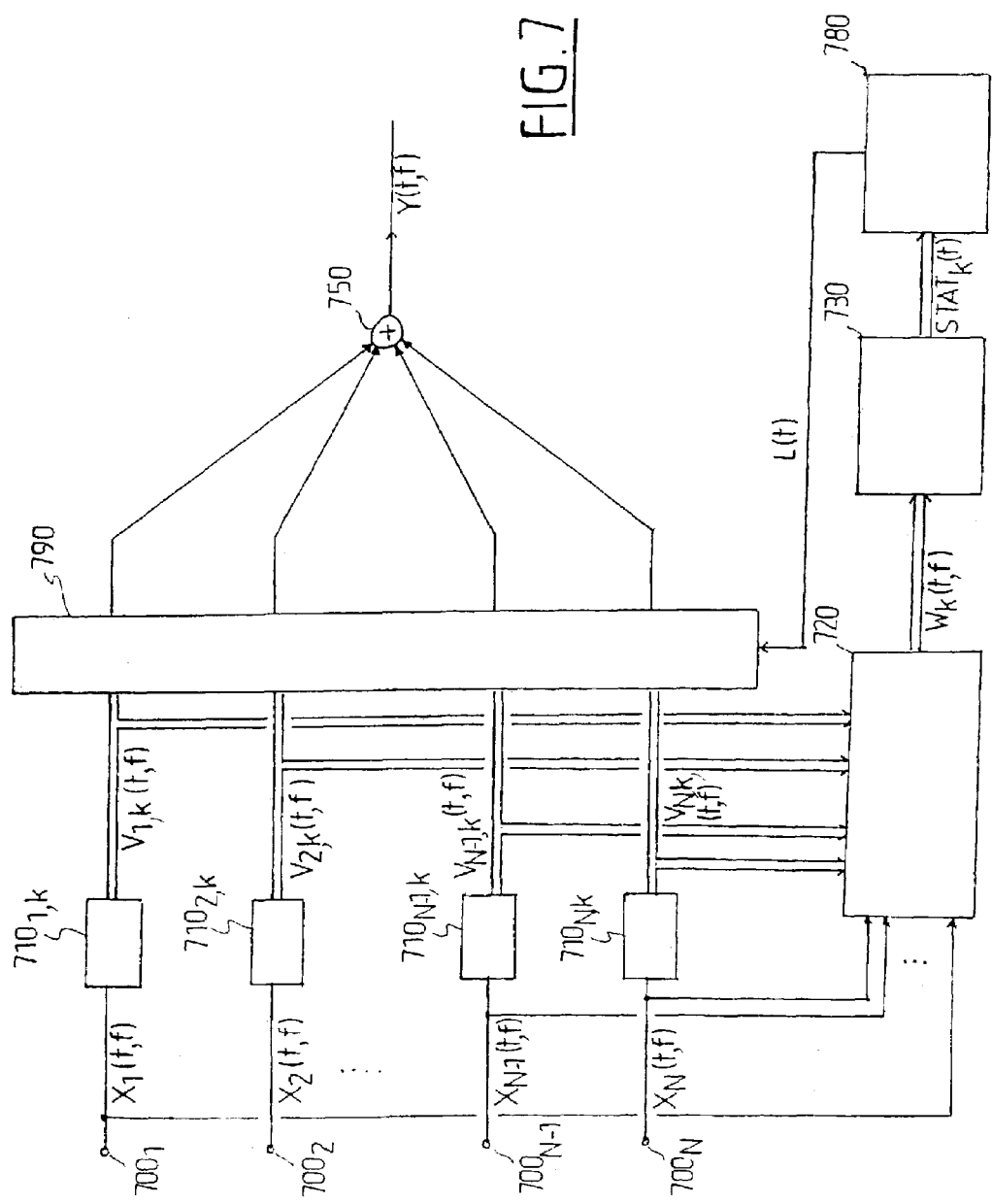
FIG. 7 is a functional block diagram of a multi-sensor antenna associated with a receiving system including the presence and the incidence of the desired signal according to one design of the present invention.

The embodiment shown in FIG. 7 as now described uses plural sets of channel filters to estimate the incidence of a desired signal.

Unlike the case above, the receiving system of FIG. 7 does not contain a single set of channel filters that is associated with pointing the antenna in a single direction, but instead contains several sets of channel filters $710_{i,k}$, where k=1 . . . K, to provide aiming in K different directions. The value k is the index of the pointing direction. The antenna input signals $X_i(t, f)$ from the sensors $700_i$ are filtered by the filters $710_{i,k}$. Said filters derive K signals $V_{i,k}(t, f)$ for each channel. If the desired source is located by the system as being in the direction of index m, the lobe switch then selects the channel signals $V_{i,m}(t,f)$. The antenna output Y(t, f) is derived by summing the latter signals.

The different sets of channel filters $700_{i,k}$ having transfer functions $a_{i,k}(f)$, where k=1 . . . K, can be implemented by a super-directional antenna technique as already discussed in connection with FIG. 3.

A calculating module $720_k$ (not shown) of the block 720 estimates for each direction k a post-filter transfer function $W_k(t, f)$. In a manner similar to the one relating to FIG. 3, said module receives either signals $X_i(t, f)$ directly from the sensors or the set of signals $V_{i,k}(t, f)$, where k=1 . . . K, following channel filtering by the set of filters $710_{i,k}$. These two embodiments are shown in FIG. 7.

It must be borne in mind that the system of FIG. 7 lacks post-filters and that only the transfer functions $W_k(t, f)$ of such post-filters are calculated. The frequency content of each post-filter is subjected to statistical analysis in order to estimate the presence and incidence of the desired signal. The transfer functions $W_k(t, f)$ can be calculated according to an equation similar to eq. 26, namely $$W_k(t,f) = \frac{\sum_{i=1}^{N} |b_{i,k}(f)|^2 \ \gamma\left(\sum_{i=1}^{N-1}\sum_{j=i+1}^{N} \hat{\Phi}_{v_{i,k} v_{j,k}}(t,f)\right)}{\gamma\left(\sum_{i=1}^{N-1}\sum_{j=i+1}^{N} b_{i,k}(f) b_{j,k}^*(f)\right) \sum_{i=1}^{N} \hat{\Phi}_{v_{i,k} v_{i,k}}(t,f)} \quad (35)$$

where $b_{i,k}(f)$ correspond to the filters $a_{i,k}(f)$ that the delay terms $\exp(j2\pi f \tau_{i,k})$, $\tau_{i,k}$ apply to the sensor $700_i$ and corresponding to the pointing action associated with the directional index k. The filters $b_{i,k}(f)$ therefore are related to the filters $a_{i,k}(f)$ by the relation $$a_{j,k} = b_{i,k}(f)\exp(j2\pi f \tau_{i,k}) \quad (36).$$

To take into account the attenuation of the desired signal, an equation similar to eq. 27 is advantageously used, namely $$W_k(t,f) = \frac{\sum_{i=1}^{N} |b_{i,k}(f)|^2 \alpha_{1,i,k}^2 \ \gamma\left(\sum_{i=1}^{N-1}\sum_{j=i+1}^{N} \hat{\Phi}_{v_{i,k} v_{j,k}}(t,f)\right)}{\gamma\left(\sum_{i=1}^{N-1}\sum_{j=i+1}^{N} b_{i,k}(f) b_{j,k}^*(f) \alpha_{1,j,k} \alpha_{1,j,k}\right) \sum_{i=1}^{N} \hat{\Phi}_{v_{i,k} v_{i,k}}(t,f)} \quad (37)$$

where $\alpha_{l,i,k}$ is the amplitude attenuation of the desired source at the sensor $700_i$, associated with the directional index k.

The frequency values of the transfer functions $W_k(t, f)$ are transmitted to a statistical analysis module 730 (more specifically, to K elementary modules $730_k$ (not shown) operating in parallel). Said module supplies statistical analysis results $STAT_k(t)$ to an active-lobe detection module 780. As discussed below, $STAT_k(t)$ can be the set of the K occupancy proportions of the K transfer functions $W_k(t,f)$ or the set of K variances of these same transfer functions or a combination of these two sets. The active-lobe detector 780 derives a signal L(t) that can assume K distinct values, each corresponding to one receiving direction. The lob switch 790 receives the signal L(t) representing an incidence m and selects the corresponding set of channel signals $V_{i,m}(t, f)$.

Figure 9:
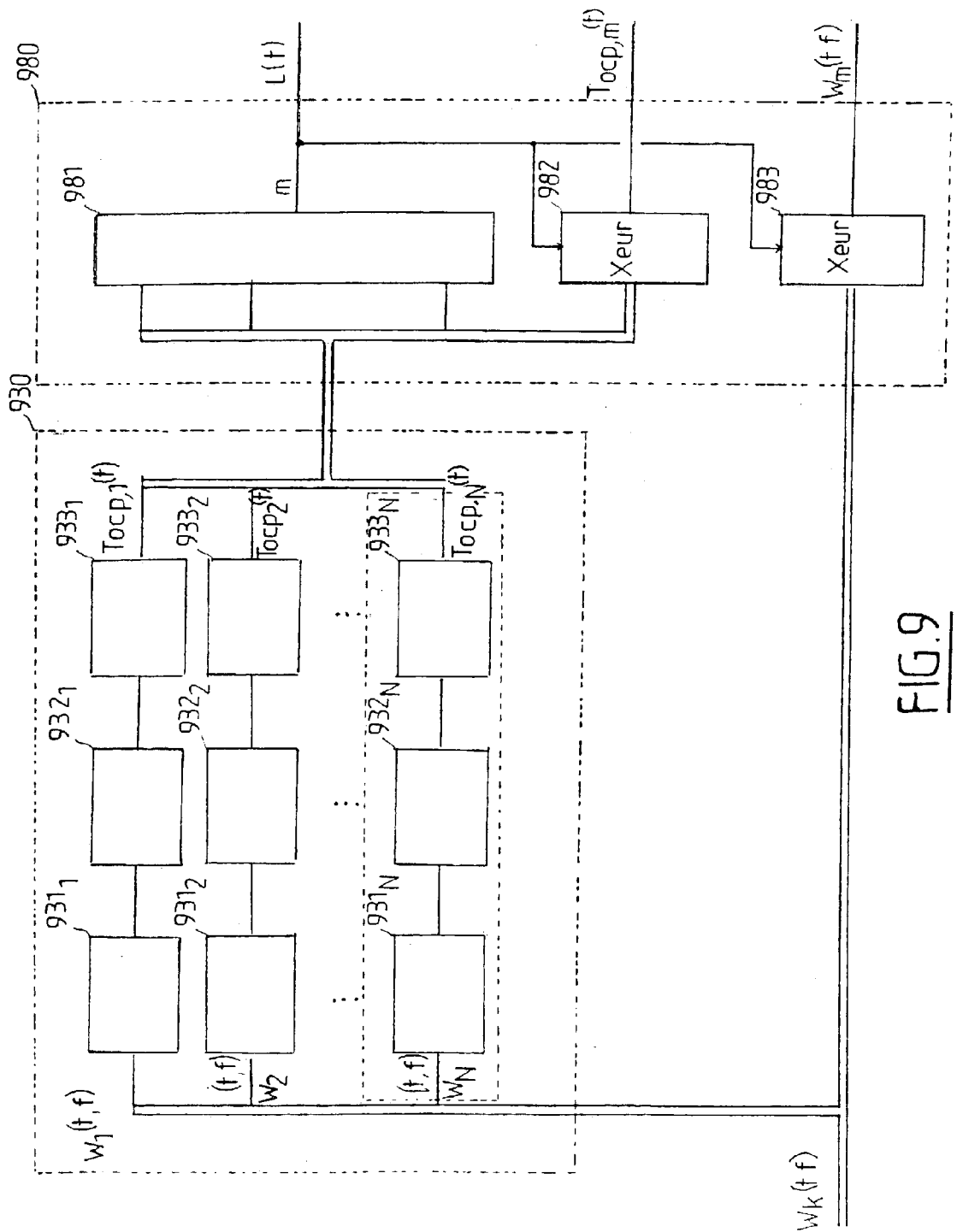
FIG. 9 is a functional block diagram of statistical analysis modules and modules for detecting the active lobe when several sets of channel filters are being used.

Details of a detection module included in the statistical analysis module 730 and the active-lobe detection module 780 are shown in FIG. 9.

The statistical analysis module 930 actually includes K elementary modules $930_k$ identical to that denoted 530 in FIG. 5. For the sake of simplicity, only the variance embodiment based on the criterion of the occupancy proportion is shown here. Obviously these elementary modules $930_k$ can use the variance criterion alternatively or jointly.

The frequency values $W_k(t, f)$ of the K transfer functions are applied to the elementary modules. Thanks to the blocks $931_k$, these modules retrieve the $W_k(t, F_{ocp})$ at frequencies $F_{ocp}$ set by the user. The retrieved values then undergo a nonlinear transformation in blocks $932_k$, for instance a logarithmic transformation (in dB as stated in eq. 28).

From the set of retrieved, transformed values $W_{\gamma,k}(t, F_{ocp})$, the proportion of frequencies $\tau_{ocp,k}(t)$ for which $W_{\tau,k}(t, F_{ocp})$ exceeds an OCT threshold (per eq. 29) is determined in $933_k$.

The set of these values of the occupancy proportion and where called for the active-lob variance values are supplied as statistical analysis results $STAT_k$, where k=1 . . . K, to the active lobe detector 980. The values $\tau_{ocp,k}(t)$ are compared by a comparator 981 and the resulting signal L(t) represents the index value of the direction m corresponding to the maximum occupancy proportion $$L(t)\text{ m in such a way that } \tau_{ocp,m}(t) = \max(\tau_{ocp,k}(t)) \quad (38)$$

where k=1 . . . K.

As mentioned above, the minimum variance criterion can be used or a combination of the criterion of maximum occupancy proportion and minimum variance can be used; if the combination is used two comparators 981 are required. When the minimum variance criterion is selected, the signal L(t) represents the value of the index of the direction m corresponding to the minimum variance value $$L(t) = m \text{ such that } VAR_m(t) = \min(VAR_k(t)) \quad (38')$$

where k=1 . . . K.

In the illustrated embodiment, the active-lobe detector selects the occupancy proportion $\tau_{ocp,m}(t)$ as a result of a first switch 982 being driven by the signal L(t). Similarly a second switch 983 driven by the same signal selects the transfer function $W_m(t, f)$ corresponding to the aiming direction m. The occupancy proportion $\tau_{ocp,m}(t)$ and/or the variance $VAR_m(t)$ are supplied to the desired signal detector in the form of the statistical analysis result $STAT_m(t)$.

It is to be realized that the two switches 982 and 983 are optional. They are not need if only incidence is determined (FIG. 7). On the other hand, they are required if the presence/absence of the desired signal is detected (FIG. 8).

Figure 8:
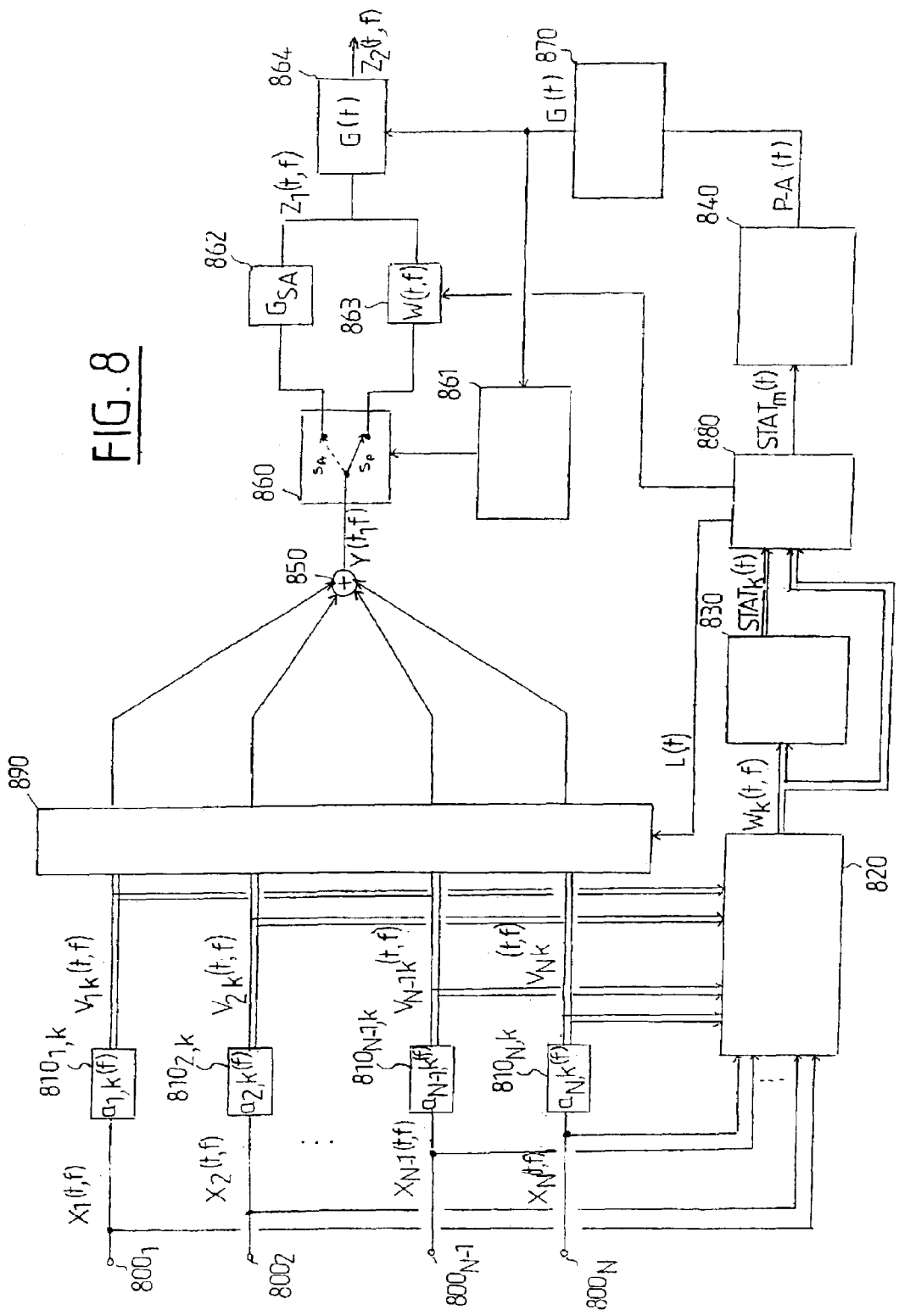
FIG. 8 is a functional block diagram of a multi-sensor antenna associated with a receiving system and for determining presence and incidence of the desired signal and including post-filtering, according to one illustrative embodiment of the present invention.

FIG. 8 is an illustration of an embodiment of the invention using a plurality of sets of channel filters as shown in FIG. 7, a desired signal detector and a post-filter as in FIG. 4.

The design of the desired signal detector 840 is identical with that of the block 540 of FIG. 5 and its details therefore are not repeated. The maximum value of the occupancy proportion $\tau_{ocp,m}(t)$ replaces the rate $\tau_{ocp}(t)$. If this occupancy proportion exceeds a threshold OCTS, a desired signal is deemed to be present. Similarly when using the variance criterion, if the minimum variance $VAR_m(t)$ is less than a predetermined threshold, SVAR, a desired signal shall be deemed present. If the two criteria are used jointly, the preceding results will be combined in order to generate a signal P_A(t).

The active lobe detector 880 has the same design as module 980, previously described in connection with FIG. 9, wherein the two switches 982 and 983 are present.

In addition to the incidence m of the desired signal, the active lobe detector 880 in this case also applies to the post-filter 863 the frequency values of the transfer function $W_m(t, f)$ and applies the results $STAT_m(t)$ to the desired signal detector 840. The remaining system operation is identical with that described in relation to FIG. 4.

The different sets of channel filters $810_{i,k}$, where k=1 . . . K, are advantageously implemented according to one of the two joint optimizing methods described in connection with FIG. 4, thereby substantially improving performance as regards locating efficacy.

An application of a receiving system of the present invention is described below in relation to FIGS. 10 to 12, concerning interactive communication sound detection (teleconferences, communicating individual computers etc.). This application implements the basic system without determining the incidence of the desired signal, that is—as regards sound detection—without locating the speaker.

For simplicity, the previously defined values are not defined again (thresholds, switched states etc.).

Figure 10:
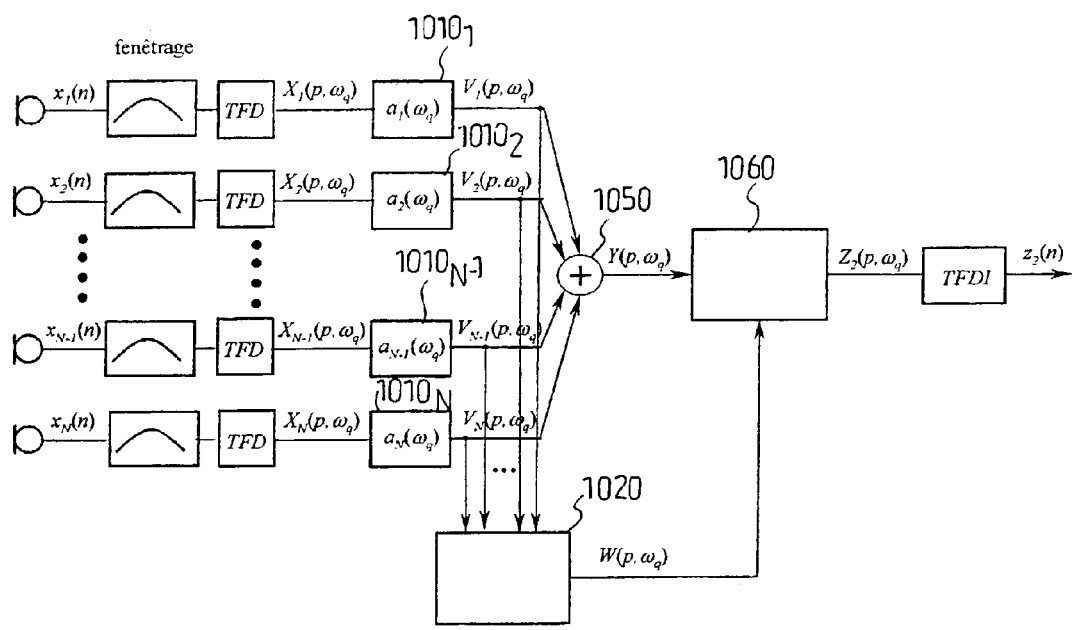
FIG. 10 is a diagram of the receiving system of the present invention when applied to sound detection.
Figure 11:
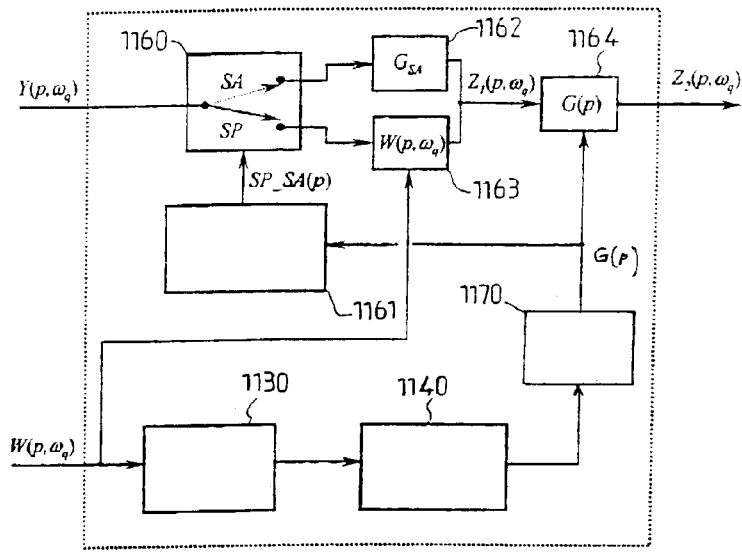
FIG. 11 is a detail of the post-processing block of FIG. 10.

It is assumed with respect to FIG. 10 that the input signals $x_i(n)$, where i=590 1 . . . N, and the output signals $z_2(n)$ are in discrete time (the analog/digital and digital/analog converters are not shown). The value "n" represents the discrete time index.

It is to be realized that the operation also can be in continuous time (i.e. analog signals and processing).

Processing is carried out by a short-term Fourier transform (or sliding time window). In analysis, the microphone signals are written as follows:

$$X_i(p, \omega_a) = \sum_{n=0}^{M-1} h_a(-n) x_i(pR+n) W_M^{-qn} \quad (39)$$

where q=0 . . . (M−1).

In synthesis, the signal is derived as follows:

$$Z_2(n) = \sum_{p=-\infty}^{p=+\infty} h_s(n-pR) \frac{1}{M} \sum_{q=0}^{M-1} Z(p, \omega_q) W_M^{q(n-pR)} \quad (40)$$

where n=0 . . . (M−1).

In analysis, a discrete Fourier transform (DFT) is used to transfer into the frequency domain. In synthesis, the return to the time domain is performed by the inverse discrete Fourier transform (IDFT).

For analysis and synthesis, DFT and IDFT advantageously are carried out by the fast Fourier transform (FFT) and inverse fast Fourier transform (IFFT). Wavelet transforms also can be used.

The following notation is used:

$h_a(n)$: analysis window of length M

M: length of analysis window (in samplings)

$h_a(n)$: synthesis window of length M (not shown in diagram because the selected window is rectangular)

R: pitch of windows shift (in samplings)

p: frame index the frequency axis being digitized uniformly, then, regarding the kth component $$\omega_q = 2\pi q/M \quad (41)$$

where q=0 . . . (M−1)

$$W_M = e^{j2\pi q0/M} = \exp(j\omega_l) \quad (42).$$

The antenna output signal $Y(p, \omega_q)$ is derived by the summer 1050 summing its input signals that were previously filtered by the channel filters $1010_i$:

$$Y(p, \omega_q) = \sum_{i=1}^{N} a_i(\omega_q) X_i(p, \omega_q) \quad (43)$$

In this representative embodiment, the transfer functions $a_i(\omega_q)$ of the channel filters $1010_i$ can be derived conventionally or by one of the two above proposed joint optimizing methods.

Post-processing at the antenna output is performed by the module 1060 symbolically shown in FIG. 10. This module is shown in detail in FIG. 11. It includes again—besides the statistical analysis module 1130 and the desired signal detector 1140—the switch 1160 at the antenna output, the fixed-gain attenuator 1162, the post-filter 1163, the variable-gain amplifier 1164, the calculating and gain-smoothing module 1170 and the comparator 1161 for comparing the gain value to a switching threshold ST.

Post-filtering $Y(p, \omega_q)$ depends on the state of the binary signal SP_SA(p). If SA_SA(p)=1 (state SP), the post-filtered signal is $$Z_2(p, \omega_q) = Y(p, \omega_q) W(p, \omega_q) G(p) \quad (44).$$

Otherwise, when SP_SA(p)=0, the state SA is $$Z_2(p, \omega_q) = Y(p, \omega_q) G_{SA} G(p) \quad (45).$$

Lastly, the output signal is derived by returning to the time domain in the manner implicated by eq. 40.

Calculating the transfer function $W(p, \omega_q)$ of the post-filter.

This calculation is carried out using eq. 26 by letting $\gamma(.) \infty Re(.)$ $$W(p, \omega_q) = \frac{\sum_{i=1}^{N} |b_i(\omega_q)|^2 \ Re\left(\sum_{i=1}^{N-1} \sum_{j=i+1}^{N} \Phi_{vivj}(p, \omega_q)\right)}{Re\left(\sum_{i=1}^{N-1} \sum_{j=i+1}^{N} b_i(\omega_q) * b_j(\omega_q)\right) \sum_{i=1}^{N} \Phi_{vivi}(p, \omega_q)} \quad (46)$$

The other conventional post-filter equations also can be used. In this manner one can use eq. 27 for $W(p, \omega_q)$ instead of eq. 26.

To limit estimation errors, $W(p, \omega_q)$ is then clipped in the interval [−1; 1] to circumvent unwanted amplifications.

Linear or nonlinear transformations can be applied to the post-filter. Illustratively priority can be given to some post-filter values near 1 and the values near 0 can be reduced more strongly (nonlinear weighting).

The estimates $\hat{\Phi}_{vi,vj}(p, \omega_q); \hat{\Phi}_{vi,vj}(p, \omega_q)$ involved a tradeoff between a long-term estimate resulting in low variance, and rapid updating of the post filter $W(p, \omega_q)$ which results in time variations of the signals involved in the present application being followed. For that purpose an averaging periodogram is used that results from exponential smoothing to provide said tradeoff and which is easily calculated using the following recursive equations.

$$\hat{\Phi}_{vivi}(p,\omega_q)=\alpha\hat{\Phi}_{vivi}(p-1,\omega_q)+V_i(p,\omega_q)V_i(p,\omega_q) \quad (47)$$

$$\hat{\Phi}_{vivj}(p,\omega_q)=\alpha\hat{\Phi}_{vivj}(p-1,\omega_q)+V_i(p,\omega_q)j(p,\omega_q) \quad (48)$$

where α is a number close to 1 and is linked to the time constant τ of the exponential smoothing by $$\alpha=\exp(-R/[\tau Fe]) \quad (49)$$

where Fe is the rate of sampling. The sum of the weights of the two terms of the second members of the above-noted estimated equations does not equal unity. The reason is that the post-filter is stated in the form of the ratio whereby the conventional weighting of one of the two terms is eliminated by (1−α).

This estimation method using exponential time weighting (also known as recursive estimation) is not mandatorily limitative. Other estimators can be used, such as direction decision estimates, peak following estimates etc.

Statistical Analysis Module

Figure 12:
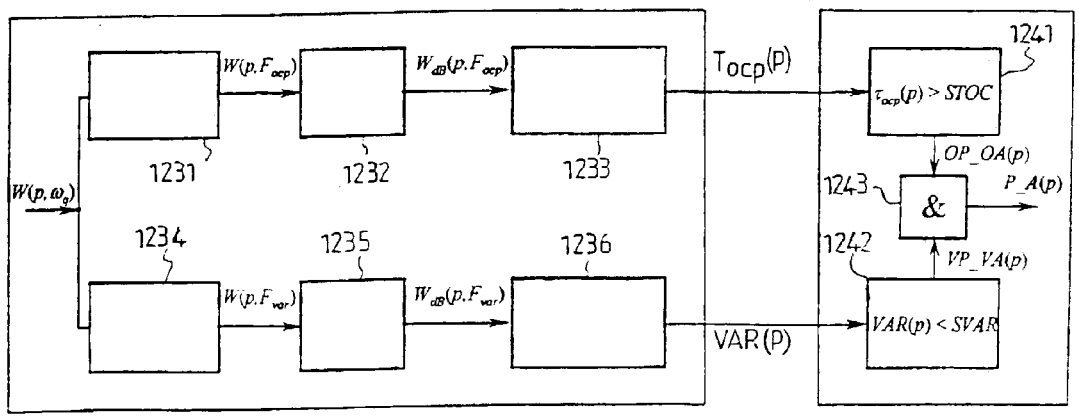
FIG. 12 is a detail of the block of statistical analysis and detection of the desired signal of FIG. 11.

FIG. 12 shows the statistical analysis module.

Module 1231 retrieve a set of discrete frequencies $F_{ocp}$ from $W(p, \omega_q)$. The signal $W(p,F_{ocp})$ so derived, then is transformed into decibels (dB) by the module 1232:

$$W_{dB}(p,F_{ocp})=20 \log(|W(p,F_{ocp})|) \quad (50).$$

Among the set of $F_{ocp}$ frequencies, the proportion of frequencies $\tau_{ocp}(p)$ for which $W_{dB}(p,F_{ocp})$ exceeds a threshold OCT is calculated by the module 1233:

$$\tau_{ocp}(p) = \frac{\text{number of frequencies } F_{ocp} \text{ such that } W_{dB}(p, F_{ocp}) > OCT}{\text{size of } F_{ocp}}$$

On the other hand, module 1234 retrieves a set of discrete frequencies $F_{var}$ in parallel from $W(p,\omega_q)$ and they are transformed into decibels (dB) in 1235, as $$W_{dB}(p,F_{var})=20 \log(|W(p,F_{var})|) \quad (52)$$

Thereupon the variance of $W_{dB}(p,F_{var})$ that is VAR(p) is calculated using 1236.

Desired Signal Detector

FIG. 12 also shows the desired signal detector. It receives the statistical results $\tau_{ocp}$ and VAR(p).

The value $\tau_{ocp}$ is compared by the comparator 1241 with a fixed occupancy threshold OCTS which emits a binary signal OP_OA(p):

$$OP\_OA(p)=1 \text{ if } \tau_{ocp}>OCTS \quad (53)$$

$$OP\_OA(p)=0 \text{ if } \tau_{ocp}\leq OCTS \quad (54)$$

On the other hand, comparator 1242 compares the value VAR(p) with a fixed variance threshold SVAR. This comparison results in the binary signal VP_VA(p):

$$VP\_VA(p)=1 \text{ if } VAR(t)<SVAR \quad (55)$$

$$VP\_VA(p)=0 \text{ if } VAR(t)\geq SVAR \quad (56).$$

The two binary signals OP_OA(p) and VP_VA(p) lastly are fed to an AND logic gate 1243 which derives the binary signal representing the desired signal detection P_A(p) which is respectively 1 and 0 for the presence and absence of the desired signal:

$$P\_A(p)=OP\_OA(p) \text{ "AND" } VP\_VA(p) \quad (57).$$

Calculating and Smoothing the Gain G(p):

The proposed G(p) gain smoothing function involves continuously decreasing the gain G(p) toward a fixed value $S_{min}$ when the desired signal P_A(p) is detected as passing from the state P (P_A(p)=1) to the state A(P_A(p)=0). In the inverse case, the gain G(p) increases continuously toward a value $S_{max}$, which in this instance is set at 1 (gain transparency in the presence of the desired signal).

In this typical example, processing is performed by sampled signal blocks. The gain G(p) is calculated and smoothed in the manner described in relation to FIG. 6 based on recursive filtration determined by the state of P_A(p):

$$G(p)=\beta_p G(p-1)+(1-\beta_p)S_{max} \text{ for } P\_A(p)=1 \quad (58)$$

$$G(p)=\beta_A G(p-1)+(1-\beta_A)S_{min} \text{ for } P\_A(p)=0 \quad (59).$$

The magnitudes $\beta_p$ and $\beta_A$ are linked to the time constants $\tau_p$ and $\tau_A$ by the relations:

$$\beta_p=\exp(-R/[\tau_p Fe]) \quad (60)$$

$$\beta_A=\exp(-R/[\tau_A Fe]) \quad (61).$$

Switching the antenna output SP_SA(p):

Switching the antenna output SP_SA(p) to apply filtering according to eqs. 44 or 45 ti (p, $\omega_q$) is determined on the basis of the smoothed gain G(p) by comparison with a fixed threshold ST in accordance with:

(51)

$$SP\_SA(p)=1 \text{ if } G(p)>ST \quad (62)$$

$$SP\_SA(p)=0 \text{ if } G(p)\leq ST \quad (63).$$

LITERATURE

[Allen 77]: J B Allen, D A Berkley, J Blauert:

"Multimicrophone signal processing technique to remove reverberation from speech signals", J. Acoust. Soc. Am. vol. 62, #4, pp 912-915, 1977

[Marro 98]: C Marro, Y Mahieux, K U Simmer:

"Analysis of noise reduction and de-reverberation techniques based on microphone arrays with postfiltering", IEEE, Trans. on Speech and Audio Processing, vol. 6, #3, pp 240-259, May 1988

{Simmer 92a]: K U Simmer, A Wassiljeff:

"Adaptive microphone arrays for noise suppression in the frequency domain, Proc. of the Sec. Cost 229 Work. on Adapt. Algorith. in Com., pp 184-185, Bordeaux, France 1992 [Zelinski 88]: R Zelinski:

"A microphone array with adaptive post-filtering for noise reduction in reverberant rooms", Proc. ICASSP-88, pp 2578-2581, New York, USA, 1988.

The invention claimed is:

1. A receiving system for a multi-sensor antenna, comprising:

at least one set of channel filters for filtering signals X i (t, f) arranged to be received at different sensors of the antenna, said signals possibly including a desired signal (S1 (t, f)), at least one calculating arrangement for receiving either the sensor signals and aligning them in phase, or the signals filtered by the channel filters, said arrangement being arranged for (a) estimating the transfer function of an optimum filter (W(t, f), W k(t, f)) in a manner to minimize the squared difference between the antenna output signal filtered by said filter and the desired signal, (b) summing the signals (V i(t, f), Vi,k(t, f) i= 1 . . . N) filtered by the channel filters, (c) deriving an antenna output signal Y(t, f), (d) statistically analyzing the frequency values of the transfer function, and (e) deriving an indication of the presence of a signal in a receiving zone in response to the statistically analyzed frequency values.

2. Receiving system as claimed in claim 1, wherein the calculating arrangement is arranged to receive the V i(t, f) signals and estimate an optimum filter transfer function in accordance with $$W(t,f) = \frac{\sum_{i=1}^{N}|b_i(f)|^2\alpha_{1,j}^2 \quad \gamma\left(\sum_{i=1}^{N}\sum_{j=i+1}^{N}\hat{\Phi}_{vi,vj}(t,f)\right)}{\gamma\left[\sum_{i=1}^{N}\sum_{j=i+1}^{N}b_i(f)*b_j(f)\alpha_{1,i}\alpha_{1,j}\right]\sum_{i=1}^{N}\hat{\Phi}_{vi,vi}(t,f)}$$

where b i(f)=a i(f)exp(−jπfτi) is the transfer function of the channel i filter without a phase reset term, α1,i is a weighting factor taking into account the attenuation of the desired signal incident on the various sensors, Φvivj(t, f) is the interspectral density of the V i(t, f) signals, Φviv(t, f) is the spectral density of the V i(t, f) signals, γ(.)=Re(.) or |.|.

3. Receiving system as claimed in claim 1, wherein the calculating arrangement is arranged to receive the X i(t, f) signals and estimate the optimum transfer function in accordance with $$\hat{W}(f) = \frac{2\gamma\left(\sum_{i=1}^{N-1}\sum_{j=i+1}^{N}\hat{\Phi}_{vi,vj}(f)\right)}{N-1 \quad \sum_{i=1}^{N}\hat{\Phi}_{vi,vi}}$$

where

Φvivj(t, f) is the interspectral density of the X i(t, f) signals,

Φvivi(t, f) is the spectral density of the X i(t, f) signals, and

γ(.)=Re(.) or |.|.

4. Receiving system as claimed in one of claim 1, wherein the calculating arrangement is arranged to perform the statistical analysis by calculating at least one of:

(a) an occupancy proportion of the frequency values of a transfer function of the optimum filter (W(t, f) above a first threshold value (OCT), and (b) a measurement of the spread of values of the frequency values of the transfer function (W(t, f)).

5. Receiving system as claimed in claim 1, comprising a single set of channel filters, the calculating arrangement being arranged to (a) receive the V i(t, f) signals and the antenna output signal Y(t, f) and (b) estimate a transfer function of the optimum filter in accordance with $$W(t,f) = \frac{\gamma\left(\sum_{i=1}^{N-1}\sum_{j=i+1}^{N}\hat{\Phi}_{vi,vj}(t,f)\right)}{\gamma\left(\sum_{i=1}^{N}\sum_{j=i+1}^{N}b_i(f)b_i^*\alpha_{1,i}\alpha_{1,j}\right)\Psi_{YY}(t,f)} \quad (27')$$

where b i(f)=a iexp(−j2πτ i) is the transfer function of the channel i filter without the phase reset term, α 1,i is a weighting factor taking into account the attenuation of the desired signal incident on the various sensors, Φ vivj(t, f) is the interspectral density of the V i(t, f) signals, Ψ YY(t, f) is the spectral density of the Y(t, f) signal, γ(.)=Re(.) or |.|.

6. Receiving system as claimed in claim 1, wherein the system includes only one set of channel filters, and the calculating arrangement is arranged to (a) detect the presence of a desired signal in response to (a) the statistical analysis resulting from the calculating arrangement and (b) derive a signal P_A(t) for indicating the presence/absence of the desired signal.

7. Receiving system as claimed in claim 6, wherein the calculating arrangement is arranged to detect the desired-signal presence by comparing at least one of (a) the occupancy proportion with a minimum proportion (OCTS) and (b) the spread of values with a critical value, the P_A(t) signal indicating the presence of a desired signal if at least one of (a) the occupancy proportion exceeds the minimum proportion and (b) the spread of values measure is less than the critical value.

8. Receiving system as claimed in claim 1, comprising K sets of channel filters where K>1, each set corresponding to a beam adapted to propagate in a different direction, wherein the calculating arrangement is arranged for (a) calculating the optimum filter transfer function (W k(t, f) associated with K sets of channel filters, (b) statistically analyzing the frequency values of the K transfer functions (W k(t, f); k= 1 . . . K), and (c) determining the incidence m∈ {1 . . . K} of the signal based on the results of the K statistical analyses.

9. Receiving system as claimed in claim 8, wherein the calculating arrangement is arranged so the incidence m∈ {1 . . . K} is determined from at least one of (a) the K statistical analyses of the respective occupancy proportions (τ ocp, k(t)) of the frequency values of the different optimal-filter transfer functions (W k(t, f)) above a first threshold value (OCT) and (b) the respective spread of value measure of the frequency values of the optimal-filter transfer functions (W k(t, f));

the incidence determination being arranged to be performed by at least one of (i) comparing said occupancy proportions and (ii) comparing said spread on values measures, the calculating arrangement being arranged to select the direction having at least one of (i) the highest occupancy ratio and (ii) the lowest spread of value measures.

10. A receiving system as claimed in claim 8 wherein the calculating arrangement is arranged to (a) switch an output signal filtered by the K sets of channel filters, and (b) select the signals from the set which corresponds to the determined incidence m and (c) cause the selected signals to be summed.

11. Receiving system as claimed in claim 9 wherein the calculating arrangement is arranged to detect the presence of the desired signal from at least one of (a) the incidence determination, (b) the highest occupancy proportion and (c) the lowest spread of values measure, the calculating arrangement being arranged to detect the desired-signal presence by (i) comparing said occupancy proportion to a minimum proportion, (ii) comparing said spread of values measure to a critical value, and (iii) providing a signal P_A(t) indicating the presence/absence of the desired signal in response to at least one of (a) the highest occupancy proportion exceeding the minimum proportion (OCTS) and (b) the lowest spread of values measure being less than the critical value.

12. Receiving system as claimed in claim 10, wherein the calculating arrangement is arranged to make the incidence determination in response to indications of the optimum-filter transfer functions and select the transfer function (W m(t, f).

13. Receiving system as claimed in claim 7 wherein the calculating arrangement is arranged to perform
a post-filtering operation in accordance with the transfer function of the optimum filter, W(t, f), or the optimum filter W m(t, f) in the case of the calculating arrangement being arranged for performing plural calculations,
a constant-gain attenuation operation,
switching of the antenna output signal either to the post-filter operation or to the attenuation operation depending on a switching signal.

14. Receiving system as claimed in claim 13, wherein the calculation arrangement is arranged to provide
(a) variable-gain amplification for a joint output of the post-filter and the constant-gain operations,
(b) control for the variable gain amplification in response to the signal indicating the presence/absence of the desired signal,
(c) a smoothed gain signal as a gain input for the variable-gain amplification, and
(d) a comparison of the smoothed-gain signal with a threshold, wherein the comparison causes derivation of the switching signal.

15. Receiving system as claimed in claim 14, wherein the variable-gain control includes low-pass filtering with a switchable time constant, the calculating arrangement being arranged so that
in response to the signal indicator indicating the presence of the desired signal a first time constant is selected,
in response to the signal indicator indicating the absence of the desired signal, a second time constant is selected.

16. Receiving system as claimed in claim 1, wherein the calculating arrangement is arranged to optimize the channel filters in a manner to maximize the directivity factor defined by:

$$Fd(f) = \frac{\sum_{i=1}^{N} b_i(f)\alpha_{1,j}}{\frac{1}{4\pi}\int_\varphi \int_\theta \left| \sum_{i=1}^{N} b_i(f)\alpha_{2,i} \exp\left(j2\pi f \frac{d_{1,j} - d_{2,i}}{c}\right) \right|^2 \sin\theta d\varphi d\theta}$$

where
b i(f)=a i(f) exp(−j2πfτ i) is the transfer function of the channel filter without its phase reset term,
α 1,i and α 2,i are weighting factors taking into account the respective attenuations of the desired signal S1 (t, f) and an arbitrary interfering signal incident on the various sensors C i after having followed paths d1,i and d 2, i.

17. Receiving system as claimed in claim 16, wherein the directivity factor is maximized by minimizing the term b(f)D(f)b H(f), where b(f) is the vector b i(f), D(f)=[1/4π] ∫∫|α₂(f)α$^H$₂(f) sin θ d$_φ$dθ provided |b H(f)α1 (f)|−1 and b(f) b H(f)<G min(f), where α 1 and α 2 are the vectors α1 (f) and α 2(f) resp. and G min sets the minimum reduction value for the incoherent noise.

18. Receiving system as claimed in claim 13, wherein the calculating arrangement is arranged to cause the channel filtering and the post-filtering to be jointly optimized by minimizing a linear combination of (a) the term
D(f)=[1/4π]∫∫|α₂(f)α$^H$₂(f)sin θ d$_φ$dθ
and (b) the term b(f)Ωb H(f), where Ω is the diagonal matrix diag(α1, i 2) provided |b H(f)α1 (f)|−1 and b(f) b H(f)<G min(f), where α1 and α2 are the vectors (α1, i) and (α 2, i) and G min(f) sets the minimum value of incoherent noise reduction.

19. Receiving system as claimed in claim 13, wherein the calculating arrangement is arranged to cause the channel filtering and the post-filtering to be jointly optimized by minimizing the term
b(f)Ωb H(f) where Ω is the diagonal matrix diag(α1, i 2) and b(f) is the vector (b i(f) under the following constraints:
|b H(f)α1 (f)|=1 and b(f) b H(f)<Fd min(f)
where α1 and α2 are the vectors (α1, i) and (α2, i) and Fd min being the minimum admissible value of the directivity factor.

20. The receiving system of claim 1 in combination with a plurality of microphones for coupling signals to the at least one set of channel filters.

21. Receiving system as claimed in claim 4 wherein the statistical analysis arrangement is arranged to provide at least one of said occupancy proportion and said spread of value measure in the form of statistical analysis results.

* * * * *